(12) United States Patent
Defant

(10) Patent No.: US 9,024,750 B2
(45) Date of Patent: May 5, 2015

(54) METHOD TO CALIBRATE A FIBER OPTIC STRAP ON A BODY WORN DEVICE

(71) Applicant: 3M Innovative Properties Company, St. Paul, MN (US)

(72) Inventor: John Christopher Defant, New Port Richey, FL (US)

(73) Assignee: 3M Innovative Properties Company, St. Paul, MN (US)

( * ) Notice: Subject to any disclaimer, the term of this patent is extended or adjusted under 35 U.S.C. 154(b) by 169 days.

(21) Appl. No.: 13/951,079

(22) Filed: Jul. 25, 2013

(65) Prior Publication Data
US 2015/0029021 A1    Jan. 29, 2015

(51) Int. Cl.
| | | |
|---|---|---|
| G08B 1/08 | (2006.01) | |
| G08B 23/00 | (2006.01) | |
| G08B 29/24 | (2006.01) | |
| G08B 21/22 | (2006.01) | |
| H04W 4/02 | (2009.01) | |
| G08B 13/14 | (2006.01) | |
| G08B 29/22 | (2006.01) | |
| G09F 3/03 | (2006.01) | |
| G08B 13/12 | (2006.01) | |

(52) U.S. Cl.
CPC .............. G08B 29/24 (2013.01); G08B 21/22 (2013.01); H04W 4/02 (2013.01); G08B 13/126 (2013.01); G08B 13/1445 (2013.01); G08B 29/22 (2013.01); G09F 3/0352 (2013.01)

(58) Field of Classification Search
CPC ........ G08B 29/24; G08B 29/22; G08B 29/20; G08B 29/18; G08B 29/02; G08B 29/08; G08B 21/22; G08B 21/0286; G08B 13/126; G08B 13/128; G08B 13/169; G08B 13/1445; H04W 4/02; G09F 3/0352
USPC ............... 340/539.1, 539.11, 539.13, 539.31, 340/568.1, 568.2, 571, 573.3, 573.4, 340/825.49, 825.69, 514; 455/456, 456.1, 455/456.3
See application file for complete search history.

(56) References Cited

U.S. PATENT DOCUMENTS

| | | | |
|---|---|---|---|
| 5,003,292 A | | 3/1991 | Harding |
| 5,289,559 A | * | 2/1994 | Wilson .......................... 385/136 |

(Continued)

FOREIGN PATENT DOCUMENTS

| | | |
|---|---|---|
| WO | WO 2006/116664 | 11/2006 |
| WO | WO 2008/055603 | 5/2008 |

*Primary Examiner* — Hung T Nguyen
(74) *Attorney, Agent, or Firm* — Emily M. Van Vliet

(57) ABSTRACT

The subject matter discloses a method and system for calibrating an electronic monitoring device having a housing and a strap being connected to a first end and a second end of the housing. The method provides for calibrating a transmission power level for signals transmitted along the strap. Then, the signal is generated and transmitted along the strap from the first end of the housing to the second end of the housing. Calibrating the transmission power level for signals transmitted along the strap provides for minimizing the power level to a lowest transmission power level detectable by a receiver located in the housing or until the signal is lower than a predefined threshold.

18 Claims, 4 Drawing Sheets

(56) References Cited

U.S. PATENT DOCUMENTS

| | | |
|---|---|---|
| 5,471,197 A | 11/1995 | McCurdy |
| 5,959,533 A | 9/1999 | Layson, Jr. |
| 6,069,563 A | 5/2000 | Kadner |
| 6,888,461 B2 | 5/2005 | Houde |
| 7,239,238 B2 * | 7/2007 | Tester et al. .............. 340/539.31 |
| 7,382,268 B2 * | 6/2008 | Hartman .................... 340/573.1 |
| 7,471,203 B2 | 12/2008 | Worthy |
| 8,115,621 B2 | 2/2012 | Rajala |
| 2005/0264427 A1 * | 12/2005 | Zeng et al. .................... 340/635 |
| 2009/0320532 A1 | 12/2009 | Bonato |
| 2011/0068765 A1 * | 3/2011 | Segoria ........................ 323/313 |
| 2011/0109461 A1 * | 5/2011 | Aninye ...................... 340/573.4 |

\* cited by examiner

METHOD TO CALIBRATE A FIBER OPTIC STRAP ON A BODY WORN DEVICE

TECHNICAL FIELD

The present subject matter relates to a calibration system for calibrating a signal in an electronic monitoring device. More specifically, a calibration system for calibrating a signal transmitted along a strap of the electronic monitoring device.

BACKGROUND

An electronic monitoring device is a bracelet or body worn device used to monitor, at a remote location, movements and optionally activities of a monitored person or item. The electronic monitoring device may be worn around a wrist or ankle of the person being monitored. The electronic monitoring device is typically used to monitor offenders as they transition to society during a parole period.

Electronic monitoring devices include a housing connected to at least one strap for securing the device around the ankle, wrist or other limb of the person being monitored. Tamper sensors detect a variety of types of tamper, including cutting of the strap and/or the removal of the device from the person. Tamper sensors may also detect any damage to the device while still attached to the person. Electronic circuitry is enclosed within the device housing and includes a microprocessor, a memory device, for receiving and processing tamper or sensor data, and one or more transmitters.

Electronic monitoring devices transmit signals to a remote location, such as a central monitoring station, or they may emit signals configured to be detected by a drive-by device carried by law enforcement personnel. The electronic monitoring device also generates signals that are transmitted along the strap, to verify that both the first end and the second end of the strap are connected to the housing. It is desirable to reduce the power consumed by the electronic monitoring device in order to decrease the frequency of replacing batteries.

SUMMARY

The present subject matter provides for minimizing the power level of the signal transmitted along the strap. By calibrating the signal transmitted along the strap, a tamper alert or alarm will be triggered when the strap is severed or stretched or pulled more than a determined length. The present subject matter also improves the battery life of the electronic monitoring device by reducing the power when transmitting signals along the strap to determine when a strap tampering event occurs (e.g., cut, pulled apart, etc).

The present subject matter also discloses a tamper evident monitoring device, comprising a housing, a strap to be wrapped around a monitored item and connected to a first end and a second end of the housing; said housing comprising a signal generator configured to generate and transmit a signal along the strap from the first end of the housing, and a receiver configured to receive the signal at the second end of the housing; a processor for calibrating a transmission power level of the signal such that the transmission power level of the signal is minimized. In an alternative embodiment, the transmission power level is reduced until the power level is lower than a predefined threshold, as long as the receiver keeps receiving the signal.

In the following description of the illustrated embodiments, reference is made to the accompanying drawings, in which are shown by way of illustration, various embodiments in which the invention may be practiced. It is to be understood that the embodiments may be utilized and structural changes may be made without departing from the scope of the present invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
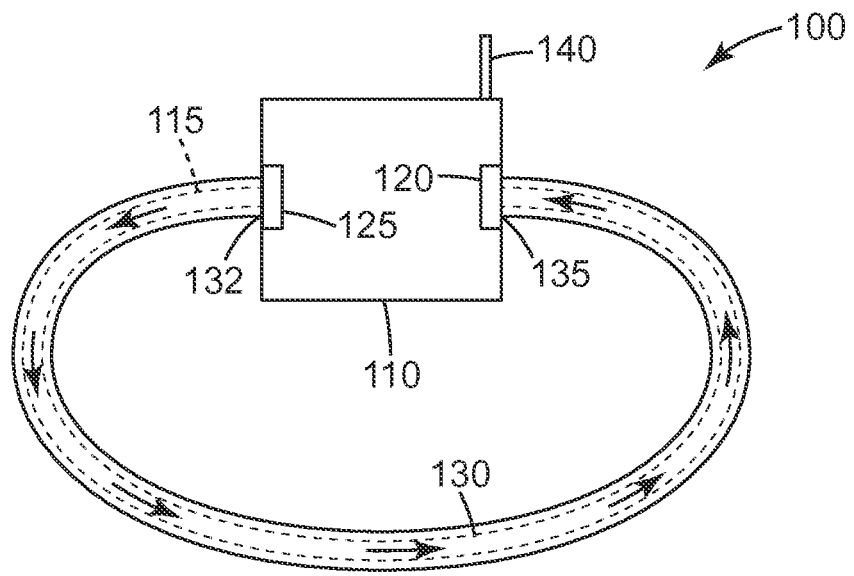
FIG. 1A shows a schematic illustration of an electronic monitoring device in normal operation.

FIG. 1A is a schematic drawing that shows an example of an electronic monitoring device 100 in normal operation. The electronic monitoring device 100 comprises a housing 110 and a strap 130 connected to a first end 132 and a second end 135 of the housing 110. The strap 130 is configured to be wrapped around a monitored item, for example wrapped around a limb of a monitored person. Fiber optic cable 115 may be incorporated into the strap 130 to enable light to be transmitted along the strap 130.

The housing 110 also includes a signal generator 125 and a receiver 120. A signal is transmitted from the signal generator 125 to the receiver 120 along the strap 130. The receiver 120 is configured to receive the signal transmitted by the signal generator 125 along fiber optic cable 115. As long as the receiver 120 receives the signal, the strap 130 is defined as being connected to the housing 110. Receiving the signal includes the decoding and demodulation of bits detected at the receiver 120. The bits transmitted by the signal generator 125 may be random, for example transmitting 4 random bits every 0.333 seconds. The signal transmitted along the strap 130 may be optical, electromagnetic, infrared, or a combination thereof.

The electronic monitoring device 100 comprises a wireless communication device 140 for transmitting signals to a remote location. For example, the wireless communication device 140 may be a radio frequency (RF) antenna or cellular modem for transmitting signals on a cellular network to a remote computerized device. The signals emitted from the electronic monitoring device 100 may include information related to the location of the electronic monitoring device 100, indicating whether the strap 130 is connected to or disconnected from the housing 110 or indicating any other type of tamper or desired information. The electronic monitoring device 100 may also include a GPS receiver for receiving signals from satellites, said signals are used to determine the location of the electronic monitoring device 100.

Figure 1B:
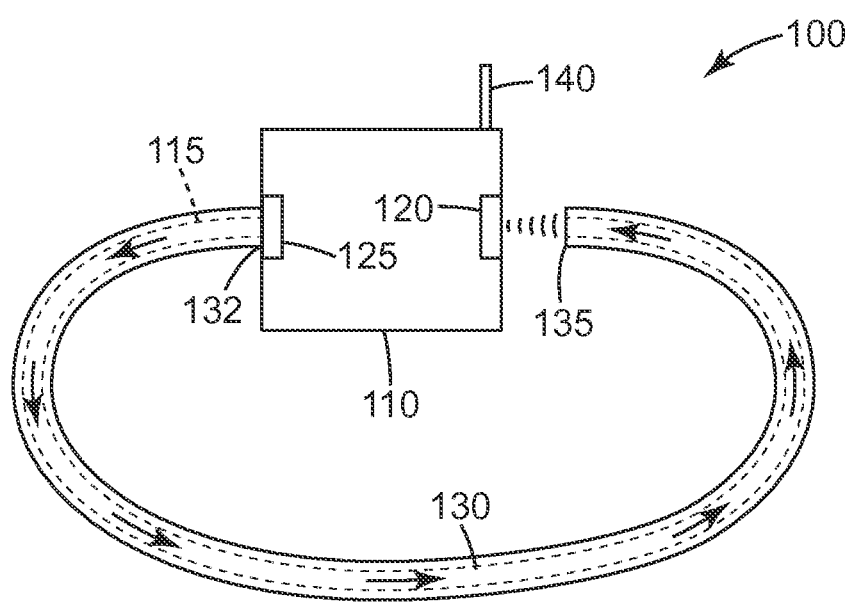
FIG. 1B shows a schematic illustration of an electronic monitoring device having its strap cut or severed.

FIG. 1B is an example of a tampered or disconnected electronic monitoring device 100. The second end 135 of the strap 130 is not connected to the housing 110, and as a result is not connected to the receiver 120. When the signal that is transmitted along the strap 130 is of high intensity, the receiver 120 may detect the signal from the second end 135 even if strap is stretched or if the second end is distanced from the receiver 120 by 1-2 centimeters, especially if the transmitted signal is optical. As a result, it is desired to transmit a low power or intensity signal to reduce the risk of the receiver 120 receiving a signal when the strap 130 is disconnected from the housing 110.

Figure 2:
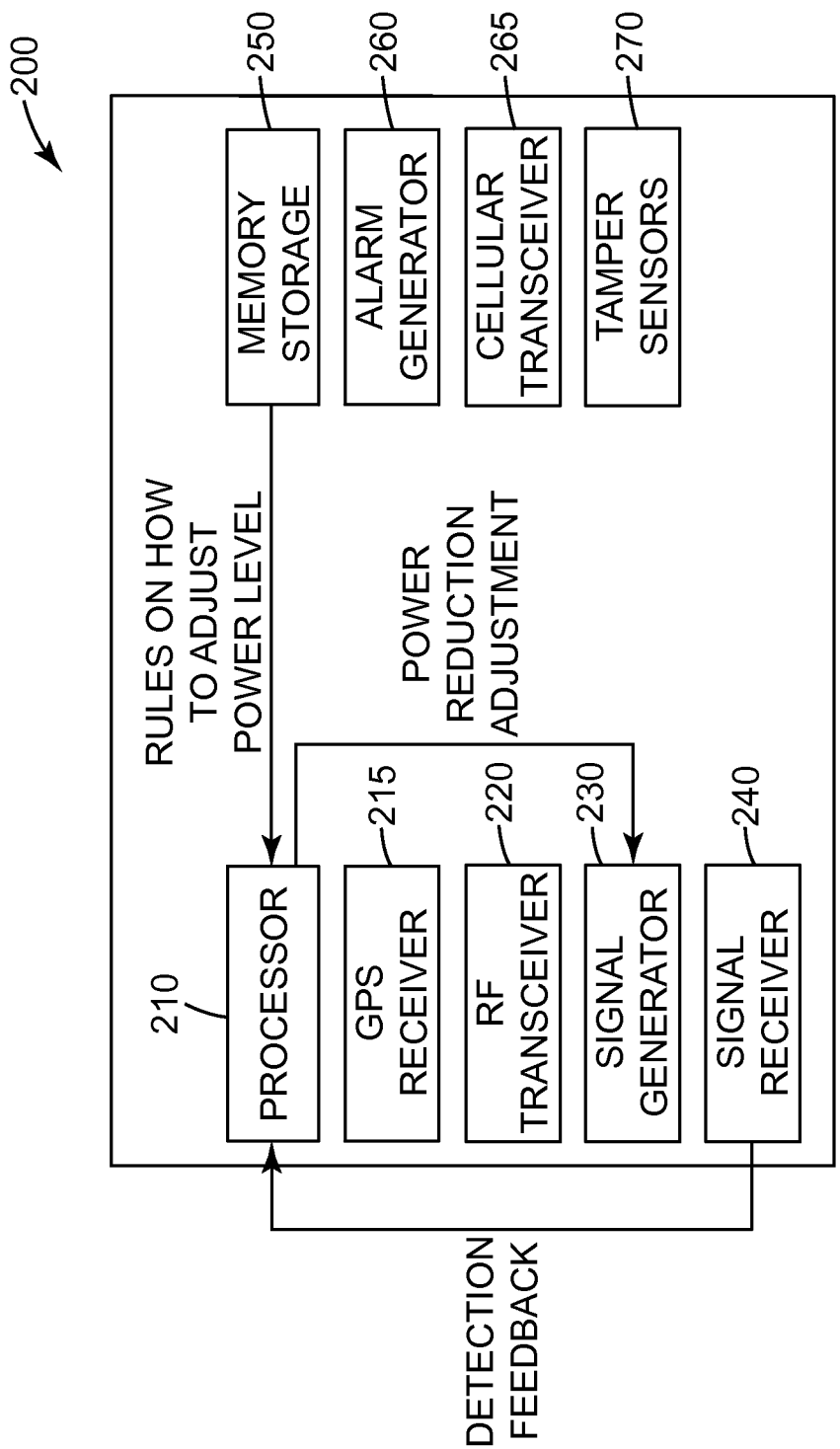
FIG. 2 shows a block diagram of computerized components included in a housing of an electronic monitoring device.

FIG. 2 illustrates components included in a housing 200 of an electronic monitoring device, such as the electronic monitoring device 100 shown in FIG. 1A. The housing includes a signal generator 230 for generating a signal and transmitting the signal along the strap connected to the housing on the first end such as the first end 132 of FIG. 1A and on the second end, such as the second end 135 of FIG. 1A. The signal generator 230 is located within the housing 200. The housing 200 also comprises a signal receiver 240 for receiving the signal. When installing the electronic monitoring device on the monitored item, a calibration process of the monitoring device is typically performed by a law enforcement officer who attaches the electronic monitoring device around a limb of a monitored person or around a monitored object. The calibration process automatically begins a predefined time after the law enforcement officer attaches the electronic monitoring device to the monitored person as soon as the strap is connected to the housing on both the first end and the second end. The predefined time may be 2-10 minutes, an amount of time anticipated as required to adjust the strap to the monitored person. The installation process includes calibration of the signal transmitted from the signal generator 230 to the signal receiver 240. The calibration is performed by a processor 210 located within the housing 200.

The calibration of the signal provides for on-going transmission of the signal from the signal generator 230. The signal is transmitted with a known transmission power level, for example 0.1 mW. When the signal is received at the signal receiver 240, the processor 210 adjusts the transmission power level transmitted by the signal generator 230. For example, the signal generator 230 emits an optical signal transmitted along the strap to the receiver for a length of a predefined cycle time, such as for example 1.2 seconds. In case the signal is optical, the signal generator 230 may include a Light Emitting Diode (LED) with variance in output power. The signal is received at the signal receiver 240. When the signal receiver 240 receives the signal, the processor 210 sends a command to the signal generator 230 to reduce the transmission power level for the next cycle. Then, the signal generator 230 transmits the signal at a reduced transmission power level, and keeps reducing the transmission power level in an iterative manner for as long as the signal receiver 240 receives the signal. When the signal receiver 240 fails to detect the signal, the calibration of the signal ends, the transmission power level is increased and the general use of the electronic monitoring device begins. In some exemplary cases, the transmission power level is increased by two levels when determining the power level for general use. In some exemplary cases, the power level of general use may be affected by environmental conditions, such as temperature, humidity, location, time and the like. In some other cases, in general use, the signal generator 230 will transmit the signal to the receiver on the lowest transmission power level detected by the signal receiver 240. For example, in case the receiver detected signals of 1 mW, 0.9 mW, 0.82 mW, 0.75 mW and failed to detect a signal having transmission power level of 0.69 mW, the signal transmitted in general use has a transmission power level of 0.75 mW.

The calibration of the transmission power level is necessary as there are many variables that need to be considered with the bracelet and strap. One of those variables is the light attenuation that may vary among different fiber optic straps. Also, infrared (IR) emitters in the bracelets or body worn devices have variability in light intensity. The amount of light that is transmitted along the strap is highly dependent on the connection between the strap and the housing, for example via a pin tray. In other words, how one end of the strap connects to the other end around a wrist or limb is important and relates to how the strap is installed on a user or offender.

The housing 200 may also include an alarm generator 260 configured to generate a tamper alarm signal when the signal receiver 240 fails to detect the signal transmitted from the signal generator 230. The alarm generator 260 begins operation after the law enforcement officer finishes the installation of the electronic monitoring device, to prevent generation of alarms during calibration of the signal, as the transmission power level of the signal is reduced to a level that is not detectable by the signal receiver 240, such that the condition for generating the alarm signal is always met during calibration, but the monitored person does not tamper with the electronic monitoring device during installation.

The housing 200 also includes memory storage 250. The memory storage 250 comprises a set of rules used to perform the calibration method. For example, the set of rules indicate that when the signal is an optical signal, the transmission power level of the signal is reduced by a value in the range of 6-10 percent, for example eight (8) percent each time that the signal receiver 240 detects the signal transmitted from the signal generator 230. The memory storage 250 may also include data regarding the monitored item, location restrictions for the monitored item, such that the alarm generator 260 may generate the alarm signal if the monitored item violates any location-based conditions stored in the memory storage 250.

The housing 200 may also include a GPS receiver 215 for receiving location-based signals from external systems in order to determine the location of the monitored item. The external systems include satellites, antennas and the like. When the signal receiver 240 fails to detect the signal, after installation of the electronic monitoring device, the alarm generator 260 may generate the alarm signal accompanied with the location of the electronic monitoring device as determined by the GPS receiver 215. The locations of the electronic monitoring device over time may be stored in the memory storage 250.

The housing 200 may also include an RF transceiver 220 and a cellular transceiver 265 for communicating with remote devices. For example, the cellular transceiver 265 is used to transmit signals to a remote central monitoring system which monitors a plurality of electronic monitoring devices, and for each monitors various parameters, such as the alarm signal or periodic signals or the location of the electronic monitoring device. The RF transceiver 220 is used to send wireless signals of a shorter range, for example, to an RF receiver located at the monitored person's home or working facility. The RF transceiver 220 may transmit signals to a wireless receiver located in the vicinity of the monitoring device, for example to a law enforcement personnel's receiver.

Figure 3:
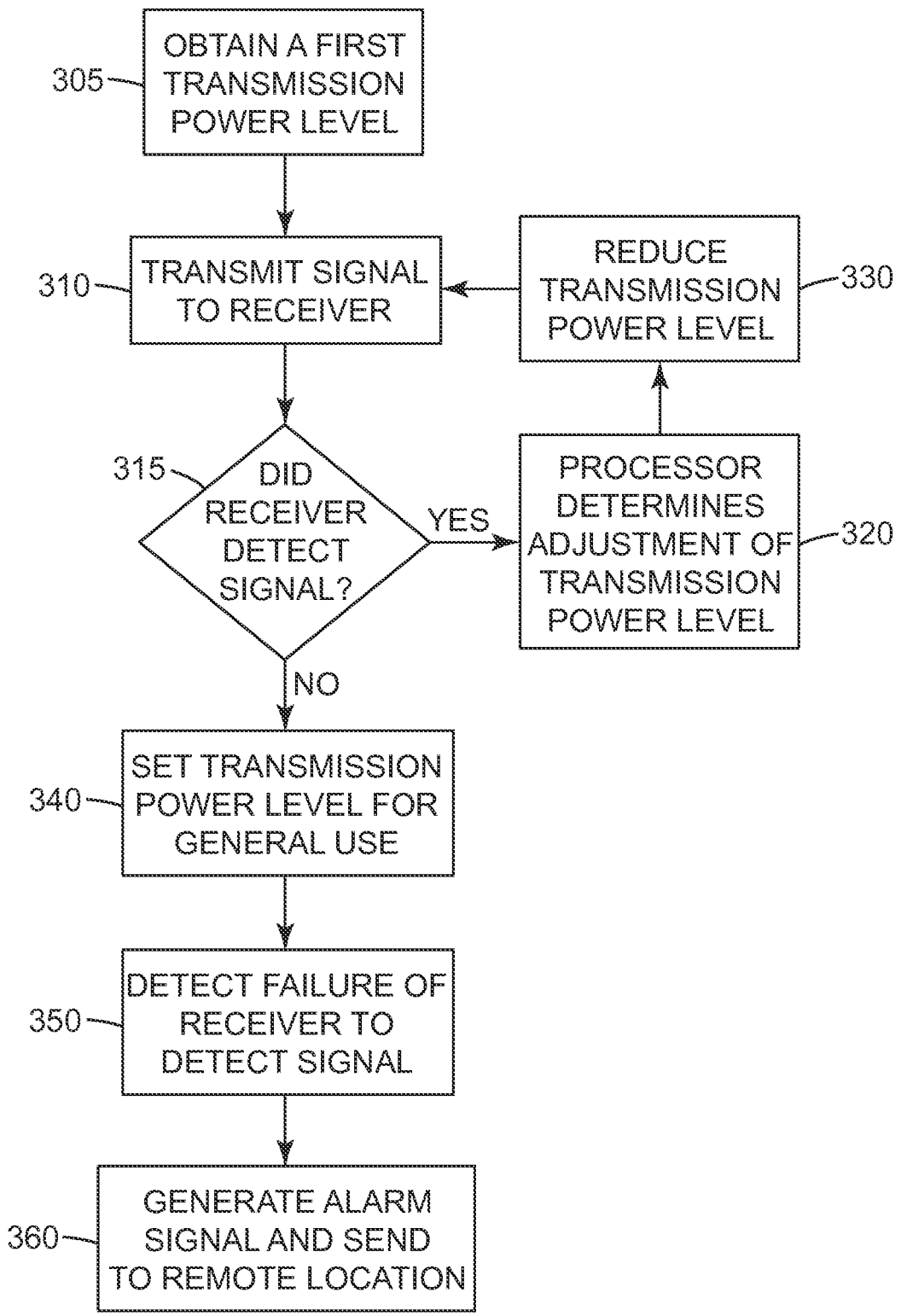
FIG. 3 shows a process diagram of a method for calibrating a signal in an electronic monitoring device.

FIG. 3 is an example of a method for calibrating a signal in an electronic monitoring device, such as the one shown and designed in connection with FIG. 2. Step 305 discloses obtaining a first transmission power level, for example from the memory storage 250. The first transmission power is the power level of the first signal transmitted from the signal generator 230 to the signal receiver 240. The power level of the first transmission power level is configured to ensure that the signal receiver 240 detects the signal. In order to begin the calibration of the transmission power level of the signal transmitted from the first end of the strap to the second end of the strap, for example, the power level of the first transmission power level may be 5.7 mW. The power level of the first transmission power level may vary according to various parameters such as the conditions of parole in case the monitored person is under parole, or the type of the signal transmitted along the strap.

Step 310 discloses transmitting the signal from the signal generator to the signal receiver along the strap. The signal may be light emitted by the signal generator and transmitted along the strap over optical fiber incorporated with the strap. The transmission may be performed in over predefined time duration, for example in the range of 0.1 to 0.5 seconds, for example by transmitting a predefined number of random bits ever 333 ms. The transmission of signals from the signal generator to the signal receiver begins with the first transmission power level. The transmission power level is later reduced, as elaborated below.

Step 315 discloses a condition of whether the signal receiver detected the signal transmitted from the signal generator or not. The signal receiver sends an indication to the processor of whether or not the signal was detected. If the signal was detected, the processor determines if and how to adjust the transmission power level to be transmitted from the signal generator to the signal receiver, as disclosed in step 320. In step 330, the signal generator reduces the transmission power level according to a command received from the processor, and the signal is then transmitted from the signal generator with a reduced transmission power level. Steps 320 and 330 occur in an iterative manner, as long as the signal receiver detects the signal with a reduced transmission power level.

After a number of reductions of the transmission power level, the signal receiver fails to detect the signal, and the calibration ends. Then, as shown in step 340, the processor determines the transmission power level for regular use of the electronic monitoring device. In some cases, the transmission power level for regular use is the last transmission power level detected by the signal receiver. In some other cases, the lowest transmission power level detectable by the signal receiver is adjusted, for example by adding five percent to the minimal transmission power level.

In some exemplary cases, the transmission power level is iteratively reduced until the transmission power level transmitted from the signal generator is lower than or equal to a predefined power level threshold. For example, the set of rules used to calibrate the transmission power level may define that a transmission power level of 0.01 mW is low enough for the purposes of calibration, and even if a lower transmission power level is detected by the signal receiver, calibration does not continue to a transmission power level not detectable by the signal receiver, but ends according to the predefined power level threshold.

In regular use, the signal determined in step 340 is transmitted on a periodic manner, for example once every 30 seconds. Then, if the signal detector fails to detect the signal in regular use, as disclosed in step 350, the processor generates an alarm signal and transmits the tamper alarm signal to a remote system, such as the central monitoring station, as shown in step 360.

The adjustment of the transmission power level determined by the processor may be performed according to a predefined set of rules stored in the memory storage. The transmission power level may be iteratively reduced according to a predefined list of transmission power levels. For example, the transmission power level may be reduced by 10 percent every time the signal receiver detects the signal. Alternatively, the reduction may be by a constant power value, such as 0.3 mW.

In some other exemplary embodiments, the reduction of the transmission power level is determined according to the signal type of the signal transmitted from the signal generator. For example, reducing 10 percent if the signal type is optical and reducing 5 percent if the signal type is electromagnetic. The reduction of the transmission power level may be determined according to the type of connection between the strap and the housing, as the signal type is known to the processor. The reduction of the transmission power level may be determined according to a known risk level of monitored item or person.

Figure 4:
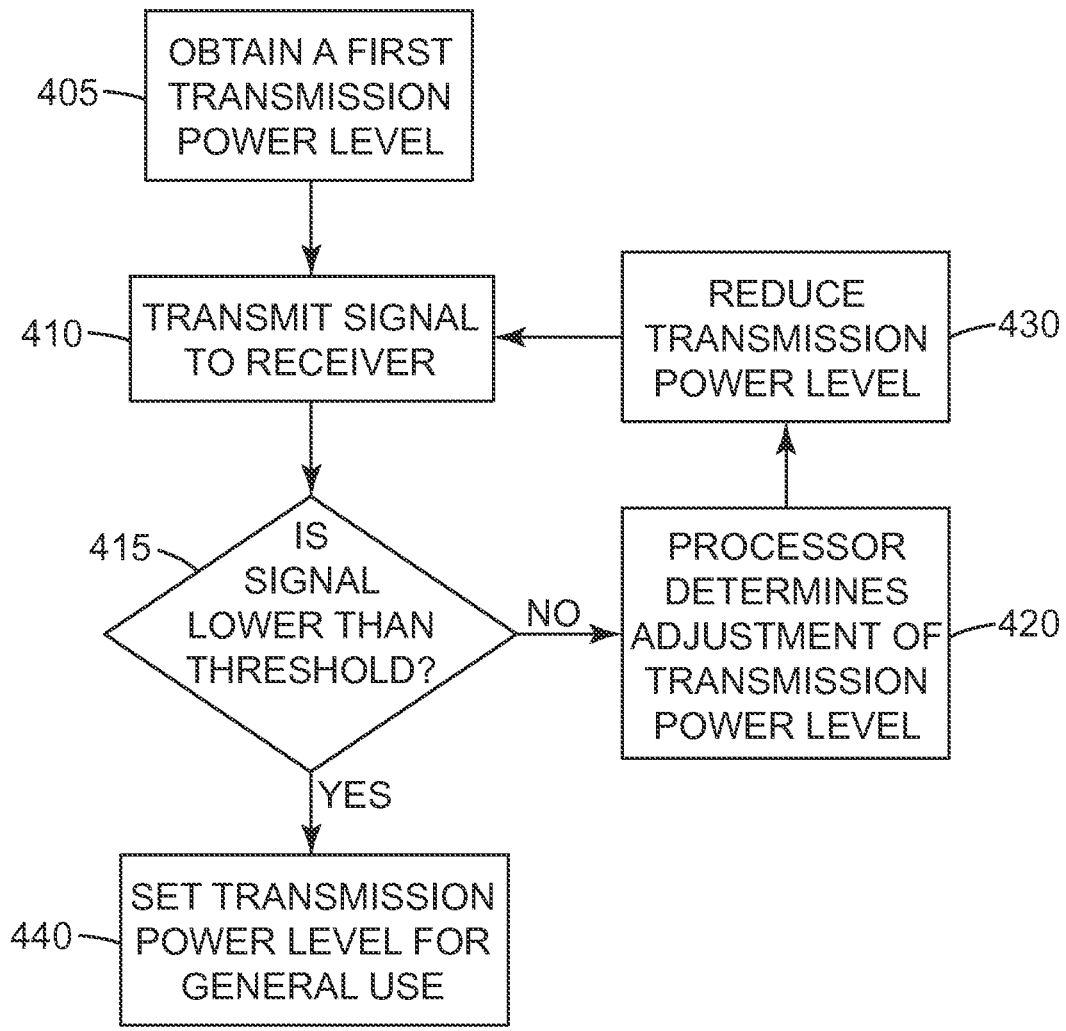
FIG. 4 shows a process diagram of a method for calibrating a signal in an electronic monitoring device relative to a predefined threshold power level.

FIG. 4 shows a block diagram of a method for calibrating a signal in an electronic monitoring device relative to a predefined threshold power level. In step 405, the signal generator 230 obtains a first transmission power level that is transmitted along the strap, for example from the memory storage 255. In step 410, the signal is transmitted from the signal generator 230 to the signal receiver 240. In step 415, the signal is detected by the signal receiver 240 and the processor 210 determines whether or not the power level of the detected signal is lower than a predefined power level threshold. If the power level of the detected signal is lower than a predefined power level threshold, the transmission power level for general use is set by the processor 210, as disclosed in step 440.

If the power level of the detected signal is not lower than a predefined power level threshold, the processor 210 determines how to adjust the transmission power level of the signal, as disclosed in step 420 and the transmission power level is reduced by the signal generator 230, as shown in step 430. Then, the signal is transmitted with the reduced transmission power level, as shown in step 415. The transmission power level is reduced iteratively, as long as the signal receiver 240 detects the signal, until the transmission power level is lower than the predefined power level threshold.

In some exemplary cases, the calibration process begins when the law enforcement officer attaches the electronic monitoring device to the monitored person's limb, having both the first end of the strap and the second end of the strap connected to the housing. In other instances, the calibration begins a predefined time after the strap is secured to the monitored person, for example 5 minutes, in case there is a need to replace the strap or to shorten it. Before the strap is connected to the monitored person, the signal generator transmits a signal every five seconds. After connection of both ends of the strap to the housing, the signal generator transmits 4 random bits every 333 ms. The time difference between every signal transmission may be a function of time that may require the monitored person to stretch the strap and remove his/her hand. The first transmission power level may be 5.7 mW which is reduced by 0.7 mW as the minimum transmission power level is 0.8 mW. The calibration may end by failure of the receiver to detect the bits transmitted or when reaching the minimum transmission power level.

The strap can be removed from the monitored person when replacing the battery of the electronic monitoring device, when the parole period is over or when there is a need to check the circuitry within the housing. In such a case, the calibration is to be reset when reattaching the strap. The storage device within the housing stores data of previous calibrations, for example the first transmission power level that was used in prior installations.

It should be noted that the computerized method of reducing the transmission power level when installing the electronic monitoring device is performed by a processor, such as a general purpose processor. The processor may perform hardware or software, such as written in assembly language, or in a software program, such as Java, C# and the like.

While the present disclosure describes a particular embodiment of the present inventions, variations on the present invention will be apparent to one of ordinary skill in the art upon reading the disclosure. For example, a reduction of the transmission power level may take a variety of configurations. A variety of signals or signal types may be transmitted to along the strap. Other variations will be apparent, and are intended to be included within the scope of the present disclosure.

What is claimed is:

1. A tamper evident monitoring device, comprising:
a housing;
a strap to be wrapped around a monitored item and connected to a first end and a second end of the housing;
said housing comprising a signal generator configured to generate and transmit a signal along the strap from the first end of the housing, and a receiver configured to receive the signal at the second end of the housing;
a processor for calibrating a transmission power level of the signal such that the transmission power level of the signal is minimized.

2. The device of claim 1, wherein the calibration comprises iteratively reducing the transmission power level to a lowest transmission power level detectable by the receiver.

3. The device of claim 1, wherein calibration is performed when installing the monitoring device on the monitored item.

4. The device of claim 1, wherein the processor is configured to generate a tamper alarm when the receiver fails to detect the transmission power level of the signal.

5. The device of claim 4, wherein the tamper alarm is transmitted to a remote location.

6. The device of claim 1, wherein the transmission power level is updated according to a signal type of the signal transmitted along the strap.

7. The device of claim 1, wherein the signal is selected from a group consisting of electromagnetic, optical, infrared, and a combination thereof.

8. The device of claim 1, further comprising a GPS receiver for receiving location-based signals from external systems and determine a location of the monitoring device according to the location-based signals.

9. The device of claim 1, further comprising a cellular transceiver for communicating with a remote central monitoring system.

10. The device of claim 1, further comprising an RF transceiver for transmitting signals to a wireless receiver located in the vicinity of the monitoring device.

11. A calibration method performed on an electronic monitoring device, said method comprising:
calibrating a transmission power level for signals transmitted along a strap of the electronic monitoring device having a housing, the strap being connected to a first end and a second end of the housing;
generating a signal and transmitting the signal along the strap from the first end of the housing to the second end of the housing;
wherein calibrating the transmission power level for signals transmitted along the strap provides for minimizing the power level to a lowest transmission power level detectable by a receiver located in the housing.

12. The method according to claim 11, further comprising generating a tamper alarm when the receiver fails to detect the transmitted signal.

13. The method of claim 11, further comprising iteratively reducing the power level to a lowest transmission power level detectable by the receiver.

14. The method of claim 11, further comprising determining how to adjust the transmission power level when the transmitted signal is detected by the receiver.

15. A calibration method performed on an electronic monitoring device, said method comprising:
calibrating a transmission power level for signals transmitted along a strap of an electronic monitoring device having a housing, the strap being connected to a first end and a second end of the housing;
generating a signal and transmitting the signal along the strap from the first end of the housing to the second end of the housing;
wherein calibrating the transmission power level for signals transmitted along the strap provides for reducing the transmission power level of the signal until the power level of the signal received by a receiver located in the housing is lower than a predefined power level threshold.

16. The method of claim 15, wherein said predefined power level threshold is defined as the power level in which the receiver fails to receive the signal.

17. The method of claim 15, wherein the transmission power level is iteratively reduced according to a predefined list of transmission power levels.

18. The method of claim 15, wherein the predefined power level threshold is updated according to a signal type that is transmitted along the strap.

* * * * *